US007604392B2

United States Patent
Brezinsky et al.

(10) Patent No.: US 7,604,392 B2
(45) Date of Patent: Oct. 20, 2009

(54) AUTOMATIC OSCILLATING BEVERAGE SHAKER

(76) Inventors: Kersti Renee Brezinsky, 1161 Manning Dr., El Dorado Hills, CA (US) 95762; Thomas John Brezinsky, 1161 Manning Dr., El Dorado Hills, CA (US) 95762; James Patrick Dudley, 6290 Folsom Blvd., Sacremento, CA (US) 95819; Victor Torres Robinson, 6290 Folsom Blvd., Sacremento, CA (US) 95819

( * ) Notice: Subject to any disclaimer, the term of this patent is extended or adjusted under 35 U.S.C. 154(b) by 0 days.

(21) Appl. No.: 12/053,800

(22) Filed: Mar. 24, 2008

(65) Prior Publication Data

US 2008/0232188 A1 Sep. 25, 2008

Related U.S. Application Data

(60) Provisional application No. 60/896,917, filed on Mar. 24, 2007.

(51) Int. Cl.
*B01F 11/00* (2006.01)

(52) U.S. Cl. .................................... 366/211

(58) Field of Classification Search ............. 366/110, 366/111, 112, 114, 116, 208–219
See application file for complete search history.

(56) References Cited

U.S. PATENT DOCUMENTS

| 1,085,450 | A | * | 1/1914 | Lopez | 366/210 |
| 2,002,323 | A | * | 5/1935 | Kurz | 366/211 |
| 2,597,536 | A | * | 5/1952 | Shields | 366/211 |
| 2,717,700 | A | * | 9/1955 | Gruzensky et. al. | 211/74 |
| 2,946,273 | A | * | 7/1960 | Hitzl | 366/211 |
| 3,331,588 | A | * | 7/1967 | Nasser | 366/211 |
| 3,735,964 | A | * | 5/1973 | Lorenzen | 366/211 |
| 3,788,611 | A | * | 1/1974 | Barbini | 366/208 |
| 4,061,315 | A | * | 12/1977 | Eitzen et al | 366/111 |
| 4,123,176 | A | * | 10/1978 | Barker | 366/213 |
| 4,162,129 | A | * | 7/1979 | Bartholemew, Jr. | 366/211 |
| 4,763,570 | A | * | 8/1988 | Bellanca | 99/348 |
| 5,499,872 | A | * | 3/1996 | Baxter | 366/213 |
| 5,788,371 | A | * | 8/1998 | Neri et al. | 366/217 |
| 5,847,294 | A | * | 12/1998 | Poole | 366/63 |
| 5,918,979 | A | * | 7/1999 | Martin et al. | 366/211 |
| D553,903 | S | | 3/2008 | Bond | |
| 2002/0110046 | A1 | * | 8/2002 | Robertson | 366/110 |
| 2007/0201301 | A1 | * | 8/2007 | Klepinger | 366/110 |
| 2008/0232188 | A1 | * | 9/2008 | Brezinsky et al. | 366/211 |
| 2009/0067281 | A1 | * | 3/2009 | Little | 366/209 |

FOREIGN PATENT DOCUMENTS

DE 29716569 U1 * 1/1998
JP 2002028465 A * 1/2002

OTHER PUBLICATIONS

JC Penney Online Catalogue, www.jcpenney.com, Martini Shaker, Nov. 19, 2007, Item No. QA780-1089B.

* cited by examiner

*Primary Examiner*—Charles E Cooley
(74) *Attorney, Agent, or Firm*—Design IP (57) ABSTRACT

A motorized beverage mixing device having a housing adapted to accommodate a beverage mixing container. The housing is adapted to removably-retain the mixing container while the housing is rotated in an oscillating motion. The housing is preferably adapted to rotate the mixing container to or past a horizontal orientation in at least one rotational direction.

19 Claims, 7 Drawing Sheets

AUTOMATIC OSCILLATING BEVERAGE SHAKER

CROSS REFERENCE TO RELATED APPLICATION

This application claims the benefit of U.S. Provisional Application No. 60/896,917, filed Mar. 24, 2007, which is incorporated herein by reference as if fully set forth.

BACKGROUND

A martini is a popular traditional alcoholic drink that has experienced a revival in recent years. A martini is traditionally prepared by combining the desired liquids and ice in a container (typically vermouth and gin or vodka, but more recently have branched out to a whole variety of mixed "martini" style drinks, such as Cosmopolitans, Lemon Drops, etc.), then shaking the container until the liquids and ice have fully mixed and the liquids have been thoroughly chilled. The mixed and chilled drink mixture is then poured into a glass. Many martini aficionados prefer that a martini be shaken 30-40 times. In addition, the making of a martini can be an entertaining process for the consumer. Most martini drinkers instantly recognize a traditional stainless steel cocktail shaker.

Due to the fact that making a high-quality martini is a somewhat labor-intensive process, it can be difficult for a host (or bartender) to prepare a significant numbers of martinis in a short period of time. In addition, repeated shaking of martinis could be a source of repetitive stress injuries for bartenders.

The present invention allows for the automatic shaking of martini, using a shaking container that closely resembles a traditional cocktail shaker and allows for the shaking process to be easily observed.

DETAILED DESCRIPTION OF THE PREFERRED EMBODIMENTS

Figure 1:
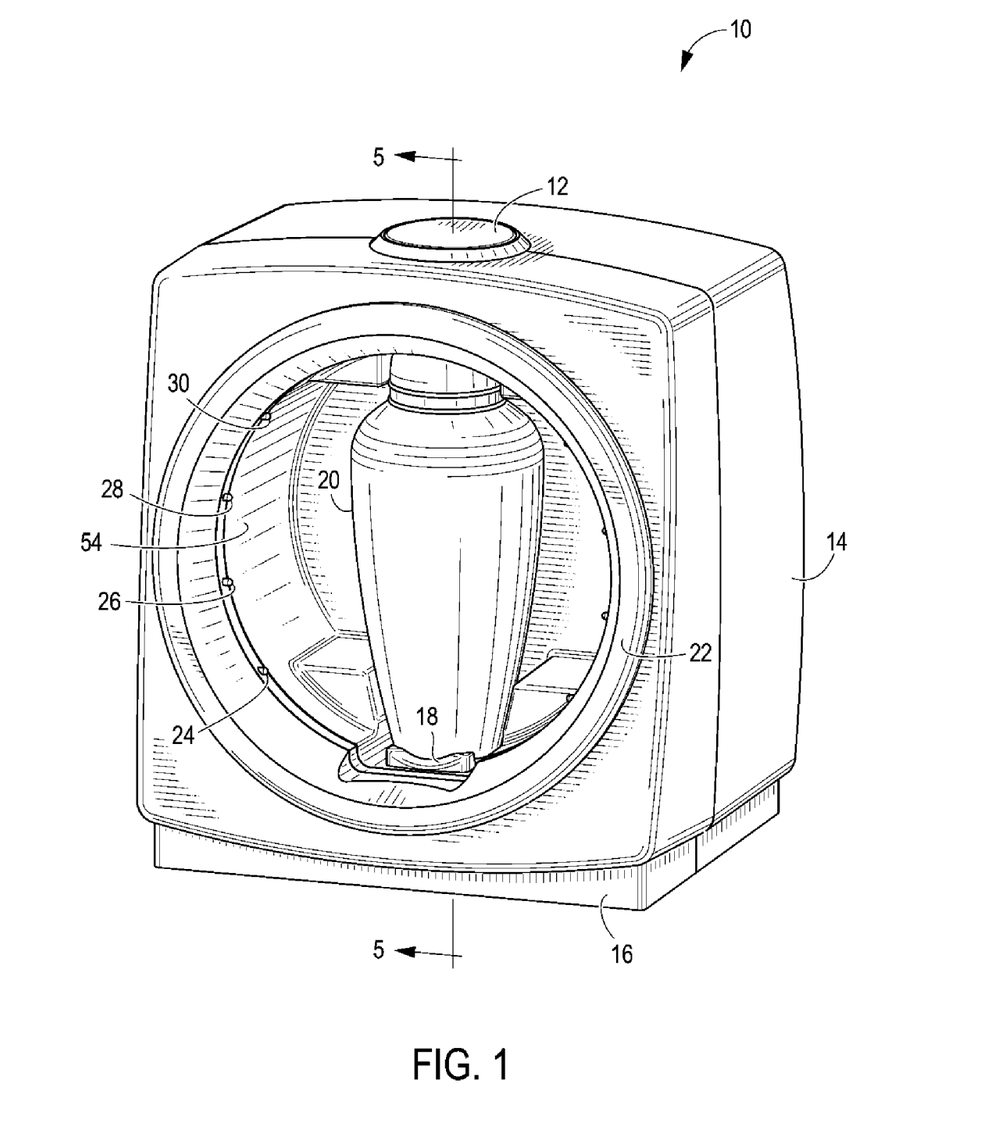
FIG. 1 is a right front perspective view of a first embodiment of the invention.

FIG. 1 shows an embodiment of a cocktail shaker 10. Rear housing 14 and front housing 16 combine to provide the overall shape and provide structure for configuring other necessary components. A button 12 provides the means of actuation. A retainer 18 holds the container 20 in place when it is positioned in the shaker 10. The front cover 22, which preferably has a chromed finish but could certainly contain a variety of different aesthetically appealing materials, provides a finished look to the front housing 16. The housings 14 and 16, button 12, retainer 18, and front cover 22 are preferably injection molded out of appropriate polymers such as polyethylene or polypropylene to achieve the part precision, structure, and styling desired.

The container 20 has a removable top 21 and both would preferably be precision fabricated from a food grade material such as stainless steel to allow easy removal of the top 21 and provide a liquid tight seal between the top 21 and container 20. The container 20 preferably has an overall appearance that closely resembles a traditional stainless steel cocktail shaker.

Figure 2:
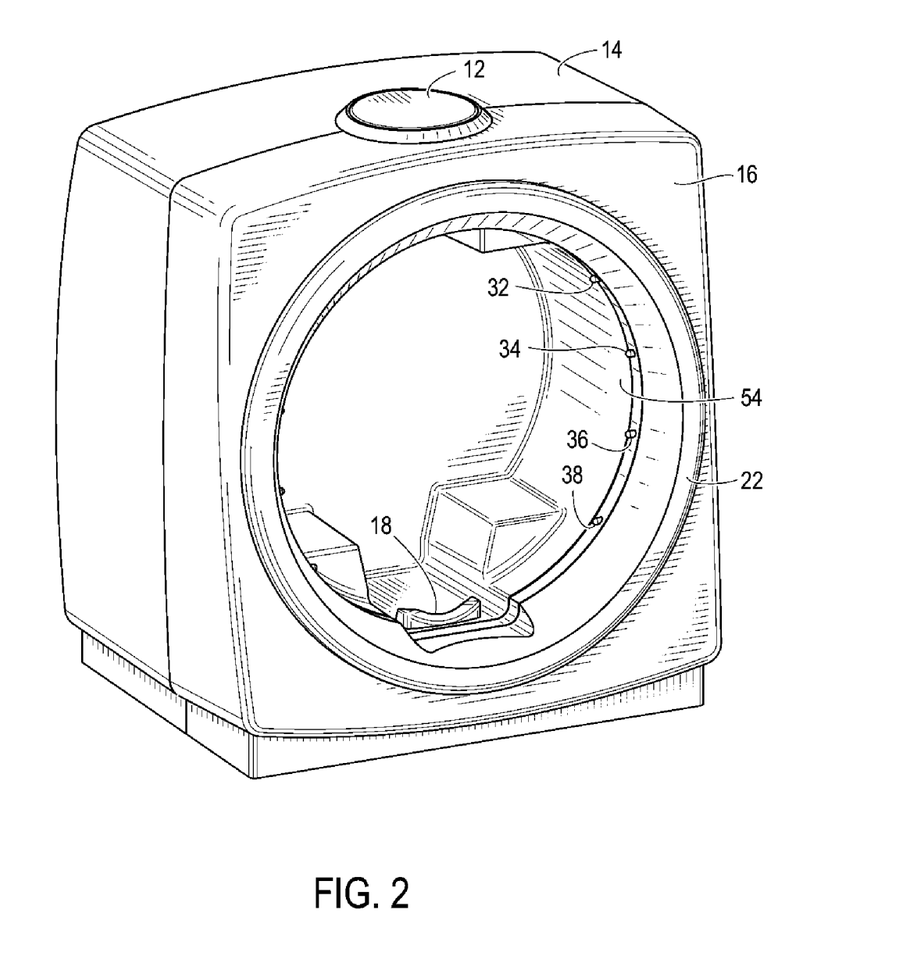
FIG. 2 is a left front perspective view thereof, shown with the container removed.

Referring to FIGS. 1 & 2 left and right side LEDs 24,26, 28,30, 32, 34, 36 & 38 are shown. In this embodiment the LEDs 24,26,28,30, 32, 34, 36 & 38 provide illumination of the container 20 during operation of shaker 10. In other embodiments of the shaker 10 the LEDs 24,26,28,30, 32, 34, 36 & 38 could indicate shaking cycle status by changing color or intermittently operating at a selected time in the shaking cycle.

In FIG. 2 the container 20 is removed to show an oscillating housing 54 that provides the structure for mounting the container 20 and has features that enable rotation within the front and rear housings 14 & 16. The oscillating housing 54 preferably would be injection molded of the material previously mentioned and has a generally planar front edge.

Figure 3:
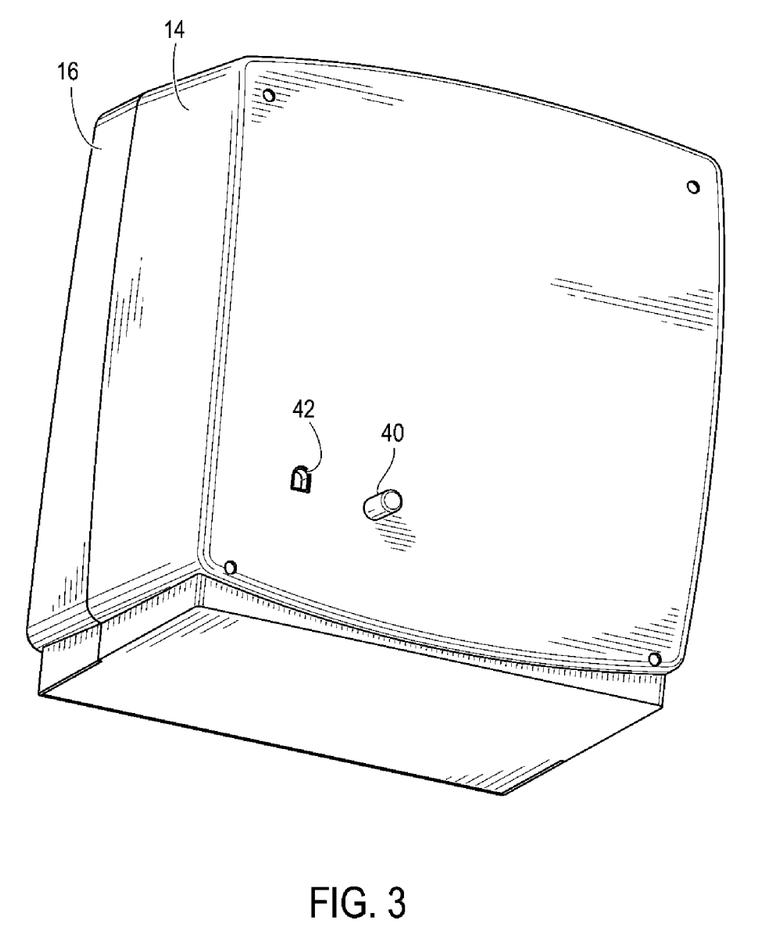
FIG. 3 is a rear perspective view thereof.

FIG. 3 shows the rear of the shaker 10 and locates the potentiometer 40 shaft and power jack 42 in the rear housing 14. In this embodiment of the shaker 10, the potentiometer 40 provides for variable speed adjustment of the movement of the oscillating housing 54. This will be described in more detail in the discussion of subsequent figures.

Figure 4:
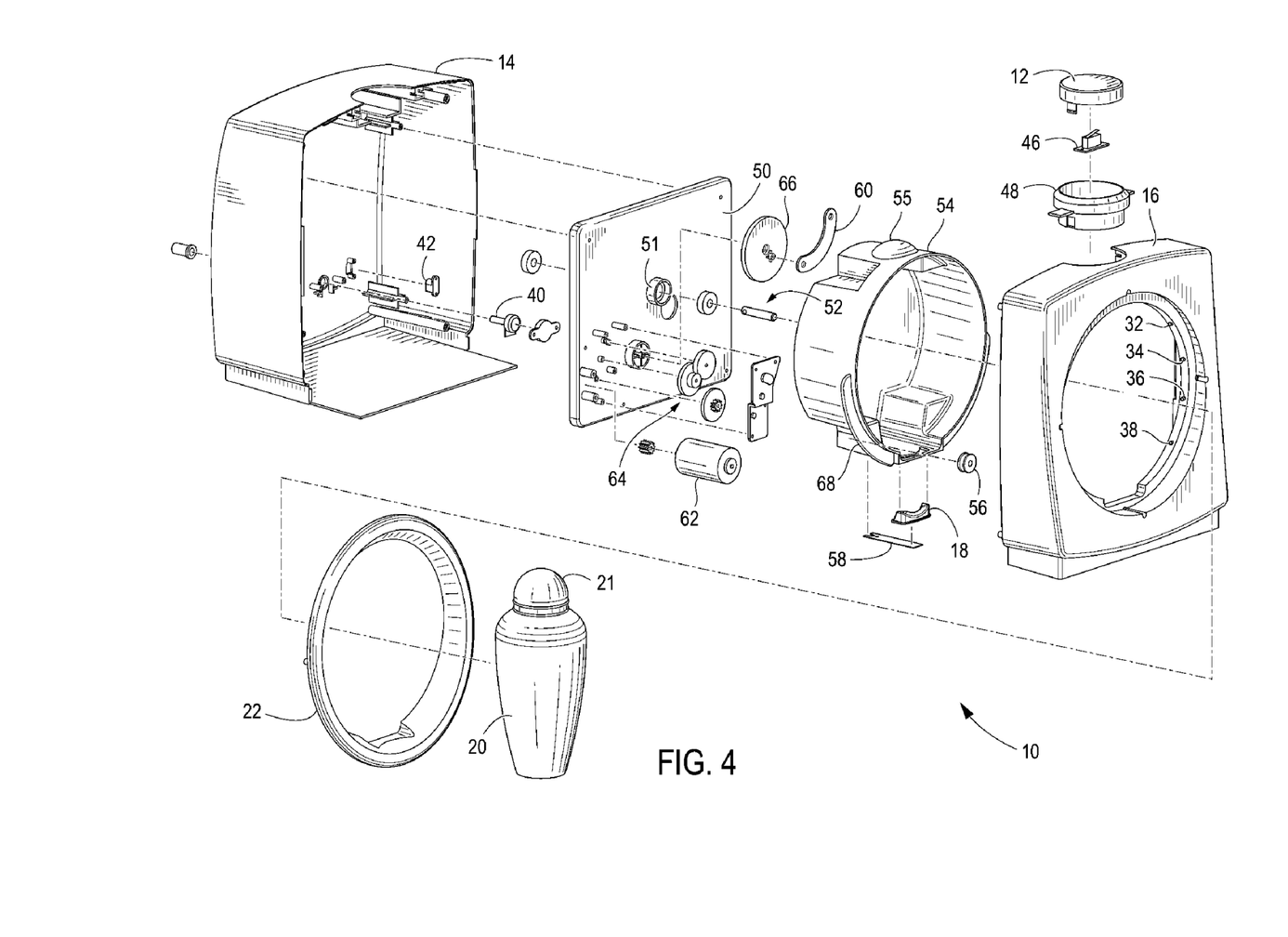
FIG. 4 is an exploded view thereof.

FIG. 4 shows the major components of the shaker 10 and their relationship to each other. Rear housing 14 and front housing 16 form the primary protective housing of shaker 10. Front housing 16 and front cover 22 are molded such that cover 22 snaps into position on the front housing 16. Container 20 is held in position when inserted into oscillating housing 54 by the fit of the shape of its top 21 (hemi-spherical in shape in this embodiment) into a corresponding shaped pocket 55 in the oscillating housing 54 and by the edge of a retainer 18 that catches its lower portion.

Retainer 18 is moveably held in its functional position by a leaf spring 58. Retainer 18 moves vertically down, as the container 20 is positioned, to allow the container 20 to be placed in oscillating housing 54 and is returned to its normal position by the leaf spring 58. At the end of a shaker cycle or at any other time desired the container 20 is removed by pulling it past retainer 18. The retainer 18 shape is such that pulling the container 20 against it moves the retainer 18 down against spring 58 force. The spring 58 returns the retainer 18 to its normal position after removal of the container 20. Retainer 18 is preferably injection molded from a suitable polymer such as polyethylene or polypropylene. Spring 58 could be fabricated from common spring steel and mechanically attached to housing 54.

Figure 5:
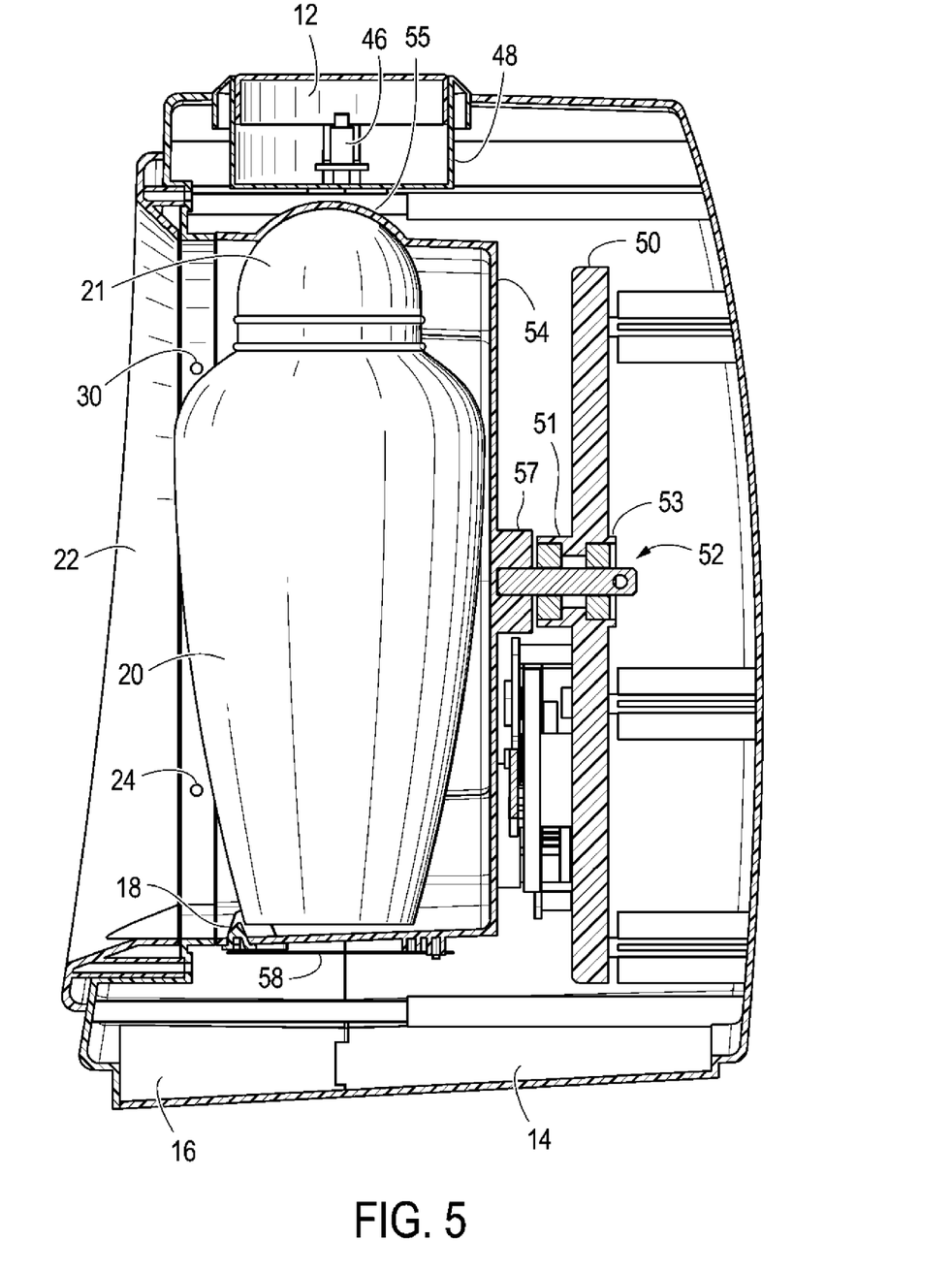
FIG. 5 is a sectional view taken along lines 5-5 in FIG. 1.

Continuing to refer to FIG. 4, the main function of oscillating housing 54 is to provide a shaking motion to container 20 during a shaker cycle. In order to fulfill this function the housing must rotate. The rotating motion is enabled and stabilized by a rib 68, roller 56 and support shaft assembly 52. Rib 68 is a molded into oscillating housing 54 and it provides a track to run in roller 56. A corresponding rib and roller exist on the opposite side, but are not shown. In the center of the rear surface of oscillating housing 54 is a circular recess 57 (see FIG. 5) which provides a mounting for one end of a support shaft assembly 52. In this way, rotation of housing 54 is supported by roller 56, the corresponding opposite roller (not shown) and support shaft assembly 52. The axis of rotation of the housing 54 is orthogonal to the planar front edge of the housing as seen in FIG. 5.

A support bulkhead 50 mounts between rear housing 14 and front housing 16 providing mounting for the rear portion of support shaft assembly 52. Bulkhead 50, for mass production, would preferably be an injection molded polymer component in order to provide the detail and structure required. A recess 51 provides the second mounting point for support shaft assembly 52. A similar recess is molded into the rear of oscillating housing 54, but is not shown. Support shaft assembly 52 can be configured in a number of ways with differing shafts and bushing combinations to provide the ability to carry a portion of the weight of oscillating housing 54 and container 20 and allow up to 45 degrees of rotation each direction for housing 54.

Rotational motion is provided by a motor 62 rotating in a single direction, a gear reduction assembly 64 and a gear 66 mounted off of bulkhead 50. Motor 62 is either A/C and/or battery-powered and, when actuated, drives gear reduction assembly 64 which meshes with gear 66. The gear reduction assembly reduces the speed of motor 62 appropriately and drives gear 66. A link 60 connects to gear 66 eccentrically and is attached pivotally to gear 66 and oscillating housing 54. When motor 62 is actuated, it provides rotary motion to gear reduction assembly 64 and thereby gear 66. As gear 66 rotates link 60 moves with a motion that causes oscillating housing 54 to rotate, depending upon link 60 length and eccentricity as much as 90 degrees in one direction and then the opposite. This oscillating rotation continues as long as motor 62 is actuated. This oscillating motion provides shaking of the contents of container 20 when the container 20 is placed in oscillating housing 54 of shaker 10.

In order to achieve optimal mixing performance, it is preferable that the oscillating housing 54 rotate the container 20 to (or beyond) a horizontal position (i.e., rotated 90 degrees from the position shown in FIG. 1) in at least one rotational direction (i.e. at either the clockwise or counter-clockwise rotational extreme). This could be accomplished by rotating the container 20 about 180 degrees (i.e., about 90 degrees in each direction from a rest position in which the container 20 is vertical). If the container 20 is rotated 180 degrees or more by the oscillating housing 54, the center of the rotational range of the oscillating housing 54 could correspond to the vertical position of the container 20 (the position shown in FIG. 1). Alternatively, the range of rotation of the oscillating housing 54 could be as little as 90 degrees and the vertical position of the container 20 could be located at one of the ends of the range of rotation of the oscillating housing 54. For example, the oscillating housing 54 could be adapted to have a 90 degree range of rotation, with the counterclockwise end of the rotational range corresponding to the vertical position of the container 20. In such an embodiment, the container 20 would rotate clockwise from a vertical position to a 90 degree (horizontal) position, then return to the vertical position. Greater or lesser degrees of rotation could be provided, as well as different rotational center locations, depending upon the specific application.

In this embodiment an external electrical power source connects at jack 42 to provide power to run motor 62. A potentiometer 40 is interconnected between the power jack 42, motor 62 and a switch 46 to provide actuation and variable speed operation of motor 62 and thereby provide a variable oscillation rate for oscillating housing 54. In this embodiment, potentiometer 40 is mounted with its shaft protruding through the rear housing 14 such as to allow external adjustment. The connection for powerjack 42 is also accessible through the rear housing 14. No wiring is shown to avoid confusion, but it is should be understood that LEDs 24,26,28, 30, 32, 34, 36 & 38, potentiometer 40, power jack 42, switch 46 and motor 62 are interconnected and that when the power jack 42 is connected to an outside power source and switch 46 is actuated motor 62 will be energized causing motion of oscillating housing 54 and the LEDs will be turned on to illuminate the container 20.

An actuation button 12 and a switch housing 48 are shown. Both could be injection molded polymer to provide economical, volume production of parts with the required functional details. Switch 46 is affixed to switch housing 48 by conventional mechanical or adhesive means. Switch housing 48 assembles into molded details of rear housing 14 and front housing 16 and is retained by the housings. In this embodiment, switch 46 is momentary and returns to off when not actuated. The actuation button 12 slidably assembles into details molded into housings 14 and 16 and when so assembled has vertical movement.

To operate this embodiment of shaker 10 the actuation button 12 is pushed down to move switch 46 to the on position and held. When released switch 46 moves to the off position and returns actuation button 12 to its initial position. Thus shaker 10 operates as long as button 12 is actuated. Alternatively, the switch 46 could be a two-way switch that would turn on when button 12 is pressed and stays on until button 12 is pressed again. As a further alternative, the shaker 10 could be configured to provide timed mixing cycles. For example, pressing the button 12 could activate 30 second, 60 second, 90 second cycles by pressing the button 12 once, twice or three times, respectively. Pressing the button 12 four times could operate the shaker 10 until the button 12 pressed again (i.e., an untimed mode).

FIG. 5 shows component part orientation from a section view through the center of shaker 10. Rear and front housings 14, 16 come together to form the structural shell. They support and position actuator button 12, switch housing 48, support bulkhead 50 and indirectly oscillating housing 54. These parts may be assembled by snapping together using detail features in the precision molded parts, adhered using common, appropriate adhesives or mechanically attached using simple screw fasteners. Support bulkhead 50 attaches to rear housing 14 and provides mounting for motor 62 and gear reduction assembly 64 which are not individually delineated in this view. Recess 51 on bulkhead 50 and the mirrored recess 53 on the opposite side are circular and provide support and retention for one end of the oscillating housing support shaft assembly 52. The opposite end of support shaft assembly 52 rests in recess 57 on oscillating housing 54.

Container 20 is shown in position for shaking. It is placed by positioning top 21 in the pocket 55 of the oscillating housing 54 and pushing its bottom portion past spring loaded retainer 18. Spring 58 allows retainer 18 to move vertically as container 20 moves over it and causes retainer 18 to be in position to hold the container 20 in place. Two of the illuminating LEDs 24, 30 are shown. Front cover 22, which can snap on or be adhered to front housing 16, completes the assembly.

Figure 6:
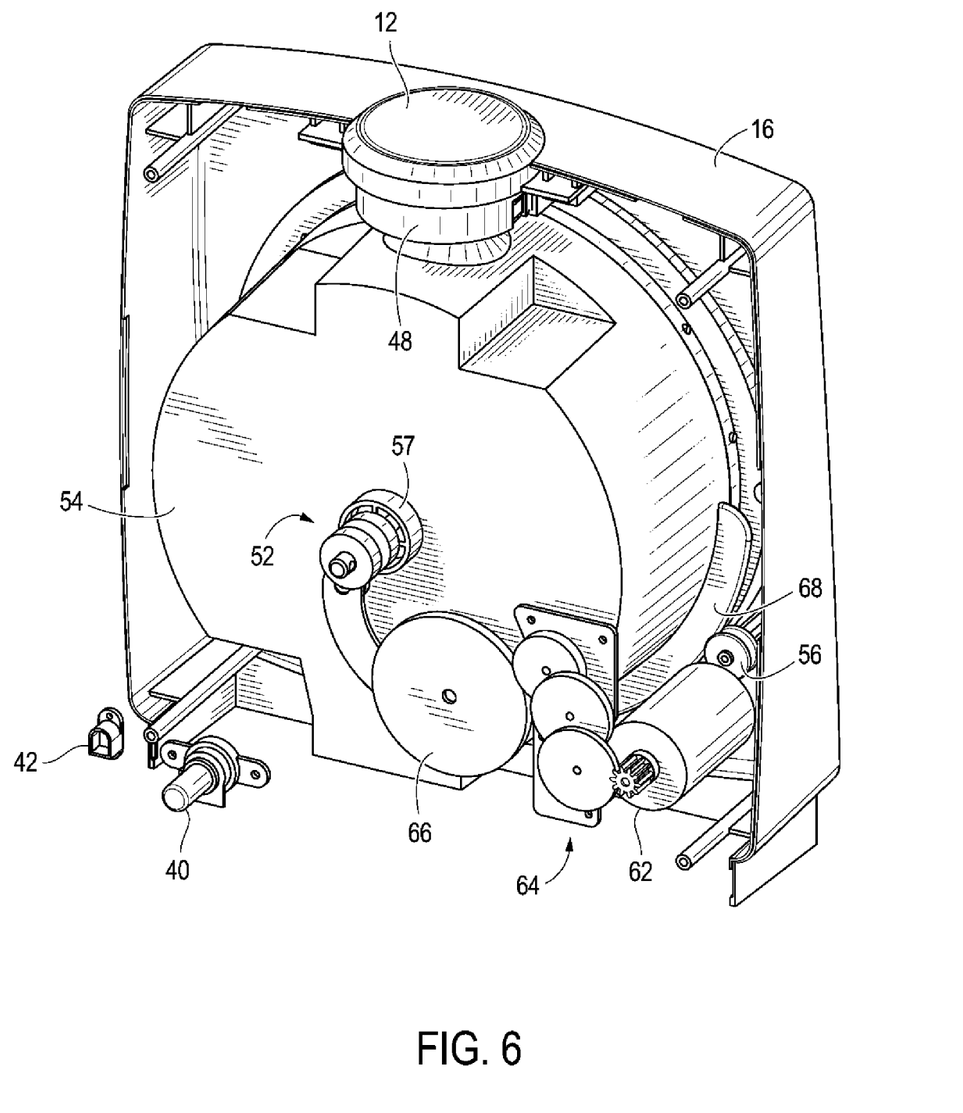
FIG. 6 is a perspective view from the rear with the rear housing and support bulkhead removed.

In FIG. 6 the functional relationship between oscillating housing 54, rib 68 and roller 56 can be seen. Roller 56 is mounted off of front housing 16, rotates freely, and supports oscillating housing 54 as the housing rotates about its center, supported by shaft assembly 52. A corresponding rib and roller exist on the opposite side, but are not shown. Motor 62 and gear reduction assembly 64 are shown in assembled location. When actuated, motor 62 operates through gear reduction assembly 64 and finally gear 66. The gear reduction assembly 64 and gear 66 reduce the rotational input speed from motor 62 to an appropriate level based on the number of gear teeth, the attachment location of link 60 on gear 66, the length of link 60, and its attachment location on oscillating housing 54. Rotation of gear 66 forces link 60, as attached to oscillating housing 54, through a reciprocating motion that causes oscillating rotation of the oscillating housing 54.

Figure 7:
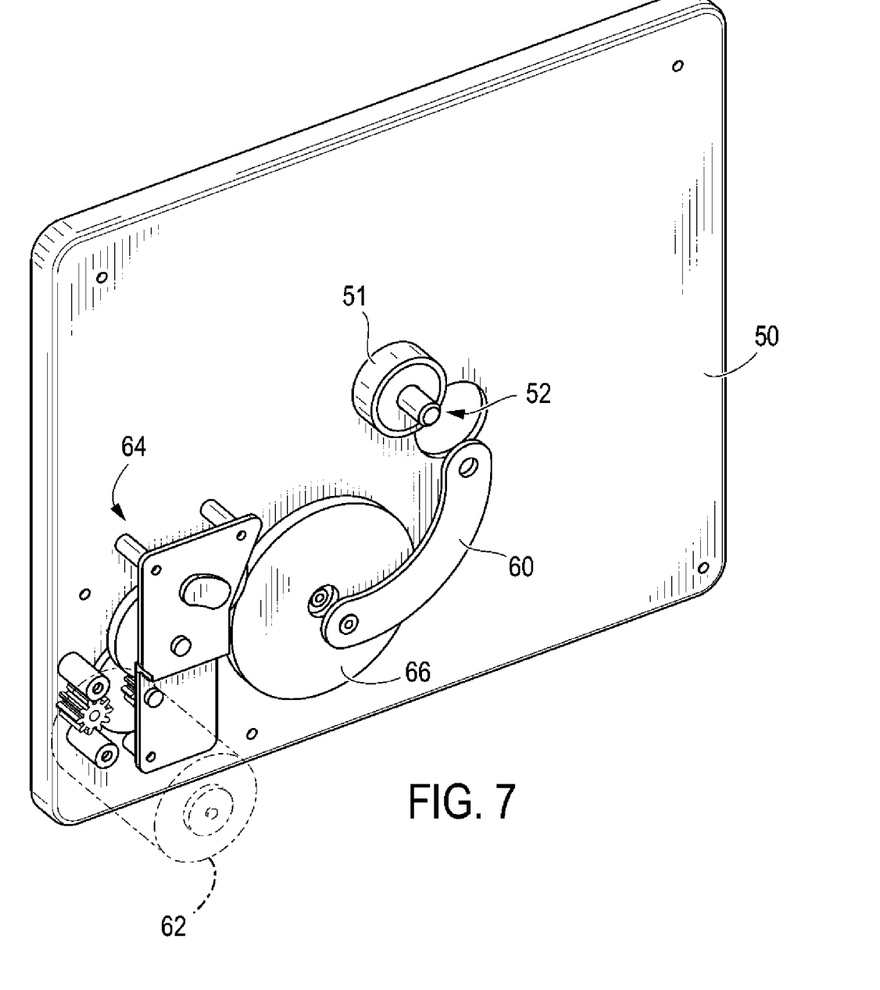
FIG. 7 is a left front perspective view of the support bulkhead and oscillating drive mechanism.

FIG. 7 shows the front of support bulkhead 50 and is included primarily to illustrate the eccentric attachment of link 60 to gear 66 that produces the reciprocating motion of link 60. As previously discussed, gear 66 is driven by motor 62 through gear reduction assembly 64. The rotational speed of gear 66 is determined by the speed of motor 62 and the gear sizes selected. The motion length of link 60 is determined by its attachment point on gear 66. For this embodiment, component selection was made to result in an oscillation angle of about 45 degrees from vertical (i.e., a total rotation of 90 degrees). As described above, oscillation angles of about 90 degrees from vertical in each direction (a total rotation of about 180 degrees) would be preferable in commercial embodiments. The speed of oscillation is controlled by potentiometer 40 previously discussed and shown in FIGS. 3, 4 & 6.

In other embodiments of the present invention, more complex shaking cycles, controls and/or LED patterns could be used. For example, a simple electronic control circuit could be used to enable predetermination/selection of the number of cycles or shake time and thus allow the cocktail shaker 10 to be actuated and left unattended during the shaking cycle. The operator or bartender could return at the end of the cycle or the shaker 10 could be placed before the customer until the cycle is complete for consumption as desired. Optionally, a visual and/or audible signal could be provided at the end of the shaking cycle. The LEDs could be turned on, off or change color at specific times during the shake cycle for entertainment or information. The variable speed adjustment enabled by potentiometer 40 would allow adaptation of the shaker 10 for preparation of various liquid products.

In addition, the shaker 10 could include a "show" or "demo" mode cycle intended to provide entertainment or draw people's attention to the device. During a show mode, the oscillating housing 54 could rotate more slowly than during a shaking cycle and the LEDs 24,26,28,30, 32, 34, 36 & 38 could illuminate the container 20. In addition, the shaker 10 could include a timer that causes the show mode to cycle on and off at predetermined intervals. The shaker 10 could also be programmed to slow to show mode after a shaking cycle is complete.

For higher volume production of mixed liquids, another embodiment of the shaker 10 could include multiple oscillating housings 54 and containers 20 in a single device. Alternatively, the container 20 could be sized to accommodate larger volumes. Also, the shakers 10 could be modular, so that multiple shakers 10 could be connected and, optionally, be centrally controlled. In addition, it should be understood that the rotational motion of the present invention could be accomplished using other structures and components.

It is recognized by those skilled in the art that changes may be made to the above-described embodiments of the invention without departing from the broad inventive concepts thereof. It is understood, therefore, that this invention is not limited to the particular embodiments disclosed but is intended to cover all modifications which are in the spirit and scope of the invention.

The invention claimed is:

1. An apparatus comprising:
a housing having a generally planar front edge which defines a front opening that allows for the insertion and removal of a container, and a retaining mechanism adapted to receive the container and hold the container in a fixed orientation relative to the housing, the housing having a rest position in which the container is vertical and upright; and
a driving assembly, the driving assembly comprising a motor and a driving mechanism that is configured to drive the housing only in an oscillating motion about an axis of rotation when the motor is continuously rotated in a single direction, the oscillating motion comprising alternating between rotation in clockwise and counterclockwise directions through a range of at least 90 but not more than 360 degrees, the axis of rotation being orthogonal to the front edge.

2. The apparatus of claim 1, wherein the housing has a generally cylindrical side wall, a generally planar rear wall that opposes the front edge, and an axle attached to the rear wall.

3. The apparatus of claim 1, wherein the housing is fully contained within a support housing.

4. The apparatus of claim 1, wherein the housing is generally cylindrical in shape.

5. The apparatus of claim 4, wherein the driving mechanism is comprised of at least one gear and a linking element.

6. The apparatus of claim 5, wherein the linking element is curved.

7. The apparatus of claim 1, wherein the driving mechanism further comprises a control circuit that allows for adjustment of the duration of the oscillating cycle.

8. The apparatus of claim 1, wherein the driving mechanism further comprises a potentiometer that enables adjustment of the oscillation rate of the housing.

9. The apparatus of claim 1, further comprising at least one LED located on the housing.

10. The apparatus of claim 9, wherein the at least one LED activates, deactivates, or changes color at a predetermined time before, during, or after an oscillating cycle.

11. The apparatus of claim 1, wherein the retaining mechanism comprises a pocket and a retainer, the pocket being adapted to accommodate the shape of the container.

12. The apparatus of claim 1, wherein the retaining mechanism comprises a leaf spring.

13. The apparatus of claim 1, wherein the driving mechanism is adapted to return the housing to the rest position at the end of each oscillating motion.

14. The apparatus of claim 1, wherein the oscillating motion has a clockwise end and a counterclockwise end.

15. The apparatus of claim 14, wherein either of the clockwise end or counterclockwise end corresponds with the rest position.

16. The apparatus of claim 14, wherein neither the clockwise end nor the counterclockwise end corresponds with the rest position.

17. An apparatus comprising:
a housing having a generally planar front edge which defines a front opening that allows for the insertion and removal of a container, and a retaining mechanism adapted to receive the container and hold the container in a fixed orientation relative to the housing, the housing having a rest position in which the container is vertical and upright; and
a driving mechanism comprising a motor and means for driving the housing in an oscillating motion about an axis of rotation when the motor is continuously operated in a single direction, the oscillating motion consisting of alternating between rotation in clockwise and counterclockwise directions through an oscillating range of at least 90 but not more than 360 degrees, the axis of rotation being orthogonal to the front edge.

18. The apparatus of claim 17, wherein the oscillating range has a clockwise end and a counterclockwise end, and either of the clockwise end or counterclockwise end corresponds with the rest position.

19. The apparatus of claim 17, wherein the oscillating range has a clockwise end and a counterclockwise end, and neither of the clockwise end or the counterclockwise end corresponds with the rest position.

* * * * *